United States Patent [19]

Billings et al.

[11] Patent Number: 5,795,380
[45] Date of Patent: Aug. 18, 1998

[54] LIGHTWEIGHT ROOF TILES AND METHOD OF PRODUCTION

[75] Inventors: Patricia Billings, Leawood, Kans.; Susan Michalski, Lee's Summit, Mo.

[73] Assignee: Earth Products Limited, Leawood, Kans.

[21] Appl. No.: 850,054

[22] Filed: May 2, 1997

[51] Int. Cl.$^6$ ............................. C04B 7/04; C04B 14/18
[52] U.S. Cl. ............... 106/675; 106/698; 106/DIG. 2; 264/333; 264/DIG. 31
[58] Field of Search ................... 106/675, 698, 106/DIG. 2, 708; 264/211, 176.1, 333, DIG. 43, DIG. 31

[56] References Cited

U.S. PATENT DOCUMENTS

| | | | |
|---|---|---|---|
| 3,741,926 | 6/1973 | Jurecic | 523/116 |
| 3,869,415 | 3/1975 | Williams | 524/2 |
| 3,917,771 | 11/1975 | Basile | 264/35 |
| 3,947,398 | 3/1976 | Williams | 524/5 |
| 4,057,528 | 11/1977 | Hunt | 524/8 |
| 4,125,504 | 11/1978 | Mani et al. | 524/5 |
| 4,151,150 | 4/1979 | Peters et al. | 524/8 |
| 4,202,809 | 5/1980 | Eash | 524/2 |
| 4,225,496 | 9/1980 | Columbus et al. | 524/425 |
| 4,304,704 | 12/1981 | Billings | 523/212 |
| 4,430,463 | 2/1984 | Mullenax | 524/5 |
| 4,649,166 | 3/1987 | De Fatis | 524/35 |
| 4,704,415 | 11/1987 | Pierce et al. | 524/8 |
| 4,758,612 | 7/1988 | Wilson et al. | 524/5 |
| 4,792,360 | 12/1988 | Pierce et al. | 524/5 |
| 4,804,688 | 2/1989 | Vassileff | 521/64 |
| 4,849,018 | 7/1989 | Babcock et al. | 524/2 |
| 5,075,358 | 12/1991 | Riley et al. | 524/5 |
| 5,108,679 | 4/1992 | Rirsch et al. | 106/698 |
| 5,122,554 | 6/1992 | Allen | 524/8 |
| 5,185,389 | 2/1993 | Victor | 524/2 |
| 5,210,989 | 5/1993 | Jakel | 106/675 |
| 5,242,708 | 9/1993 | Fekete et al. | 427/136 |
| 5,276,074 | 1/1994 | Allen | 524/8 |
| 5,288,775 | 2/1994 | Bischoff et al. | 524/2 |
| 5,290,355 | 3/1994 | Jakel | 106/675 |
| 5,332,435 | 7/1994 | Wright et al. | 106/727 |
| 5,352,290 | 10/1994 | Takeshita et al. | 106/802 |
| 5,384,355 | 1/1995 | Allen | 524/650 |
| 5,393,343 | 2/1995 | Darwin et al. | 106/808 |
| 5,395,442 | 3/1995 | Dunton et al. | 106/724 |
| 5,498,683 | 3/1996 | Kim | 526/320 |
| 5,603,758 | 2/1997 | Schreifels, Jr. et al. | 106/677 |

FOREIGN PATENT DOCUMENTS

| | | |
|---|---|---|
| 432115 | 6/1991 | European Pat. Off. |
| 53-28455 | 8/1978 | Japan . |
| 58-190884 | 11/1983 | Japan . |
| 60-171260 | 9/1985 | Japan . |

OTHER PUBLICATIONS

PCT No. WO 91/03438 abstract (Mar. 1991).
WPIDS Abstract No. 83–714613 which is an abstract of Japanese Patent Specification No. 58–099159 (Jun. 1983).
WPIDS Abstract No. 84–044631 which is an abstract of Great Britain Patent Specification No. 2,124,672 (Feb. 1984).
WPIDS Abstract No. 85–022159 which is an abstract of Japanese Patent Specification No. 59–217687 (Dec. 1984).
WPIDS Abstract No. 93–012052 which is an abstract of Japanese Patent Specification No. 04–338181 (Nov. 1992).
WPIDS Abstract No. 97–369254 which is an abstract of Japanese Patent Specification No. 09–156993 (Jun. 1997).
WPIDS Abstract No. 97–411151 which is an abstract of Japanese Patent Specification No. 184247 (Jul. 1997).

*Primary Examiner*—Anthony Green
*Attorney, Agent, or Firm*—Kokjer, Kircher, Bowman & Johnson

[57] ABSTRACT

A roof tile which is lightweight and yet strong has a dry component that includes cement, gypsum, perlite aggregate, lava stone and a powder that may be perlite powder or volcanic ash. Water and a styrene acrylic catalyst are mixed with the dry constituents. The composition can be formed into the shape of roof tiles by conventional equipment.

12 Claims, 1 Drawing Sheet

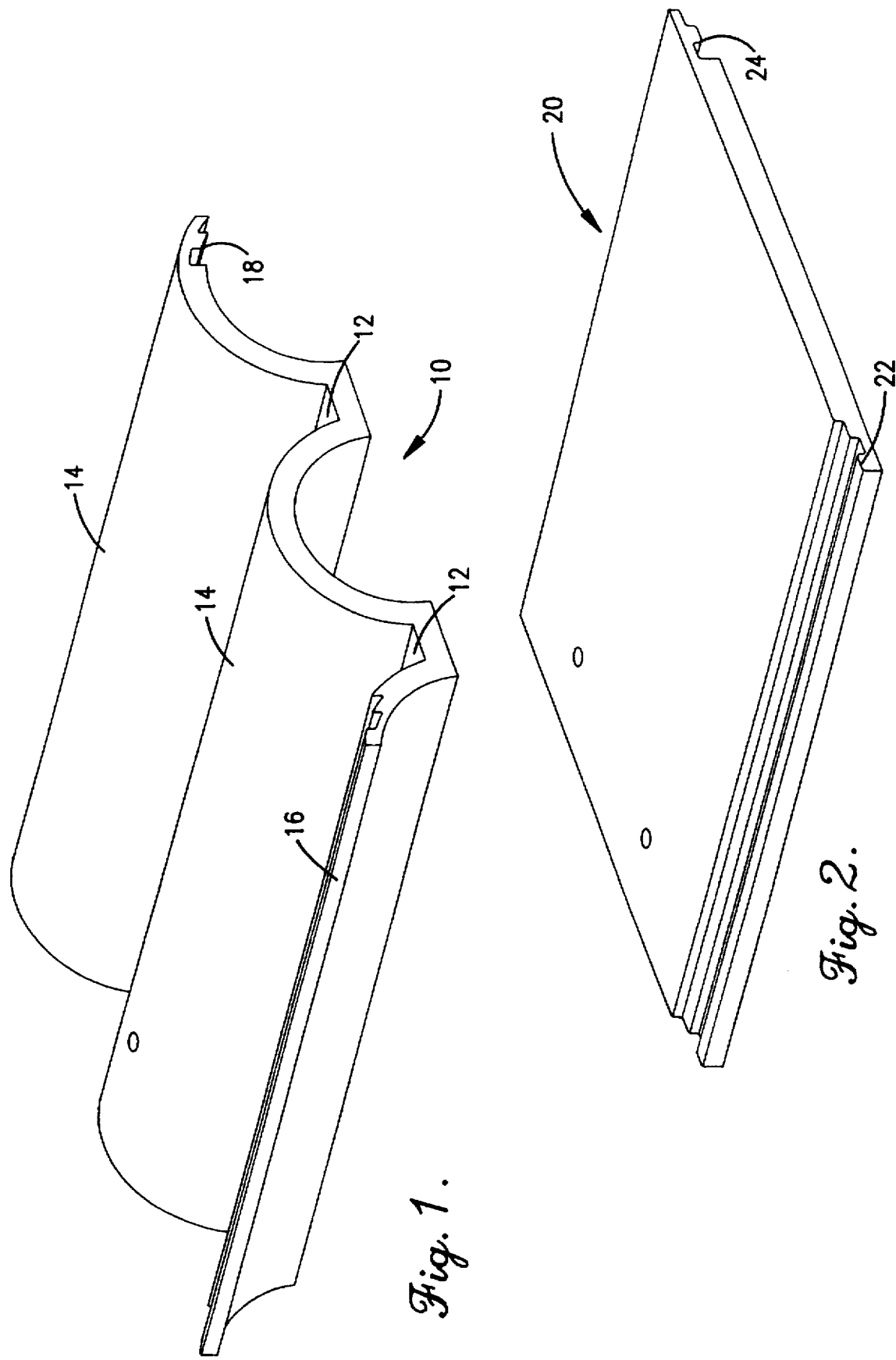

LIGHTWEIGHT ROOF TILES AND METHOD OF PRODUCTION

FIELD OF THE INVENTION

This invention relates to roofing tiles and more particularly to a lightweight roof tile which exhibits fire resistance, as well as to a novel method for fabricating a roof tile.

BACKGROUND OF THE INVENTION

Roof tiles have long been used as roofing for a wide variety of buildings and exhibit advantages in some respects over other materials such as wood, slate or asphalt. Tiles are advantageous over wood shingles because of their fire resistance. However, they are considerably heavier than wood. Consequently, the rafter system for a tile roof must be stronger than for a wood roof, and this increases the building costs. If a building having wood or asphalt shingles needs to have its roof replaced, roof tiles can normally be used only if the roof framing is reinforced and strengthened, which can involve significant structural work that increases the cost appreciably.

Concrete roof tiles have achieved considerable popularity, especially in some parts of the country. The principal problem with concrete tiles is their weight, although efforts have been made to produce lighter concrete roof tiles. For example, U.S. Pat. No. 5,395,442 to Dunton et al. discloses a concrete roof tile which is intended to be light in weight without sacrificing strength. However, there is generally a reduction in strength and other beneficial properties when lightweight materials are substituted for heavier ones in a cementitious product. In addition to the loss of strength, tiles that are reduced in weight can lose their fire resistance, they can increase in their absorption of water, and they can lose their ability to withstand repeated cycles of freezing and thawing.

The production of concrete roof tiles is plagued by high costs due in part to the energy costs. Concrete tiles must be cured in rooms where the humidity level is carefully controlled. This adds to both the cost and complexity of the production process, and it requires large capital expenditures for the construction of humidity controlled rooms.

For these and other reasons, the commercial acceptance of concrete roof tiles has not been as favorable as it could be without the foregoing problems.

SUMMARY OF THE INVENTION

The present invention is directed to a roof tile that has a lightweight construction while still exhibiting the impact strength necessary to withstand the forces to which it is subjected while in service and to also comply with prevailing building codes. Among the other important characteristics of the roof tile of the present invention are its ability to resist fire, to resist water and moisture penetration, and to resist damage due to freeze-thaw cycles.

These features are achieved through the use of a novel composition used to construct the tiles. Strength is provided by cement and gypsum and by perlite aggregate and lava stone which are dispersed throughout each tile. Perlite powder or volcanic ash fills the gaps between the aggregate and stone particles to assure that the entirety of the tile is resistant both to fire and to water penetration.

The lava stone is lightweight to reduce the weight of the tile. However, the addition of the lava stone with its irregular shape and pores adds strength to the tile when combined with the powdered components, and a styrene acrylic catalyst by filling the pores and creating a stronger unit. This enhances the strength of the tile as well as its fire and water resistant traits. The catalyst also reacts chemically with the gypsum to enhance the strength of the tile and to assure that it is not susceptible to chipping or crumbling as can occur with concrete tiles.

The present invention also provides an improved method of constructing roof tiles. Standard equipment of the type used to produce conventional concrete tiles can be used, so there are no special equipment costs. The formulation of the tile allows it to be air dried at ambient temperature after it has been extruded into its final shape, in contrast to the humidified curing required for concrete tiles. Thus, the capital costs and energy costs associated with this aspect of concrete tile production are avoided.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of a barrel type roof tile constructed of the composition of the present invention; and FIG. 2 is a perspective view of a flat roof tile constructed of the composition of the present invention.

DETAILED DESCRIPTION OF THE INVENTION

Referring initially 1, numeral 10 generally designates a barrel type roof tile constructed using the composition of the present invention. The tile 10 has a conventional shape and presents valleys 12 located between ridge areas 14. Between each pair of valleys 12, the tile curves in a semi-cylindrical shape. The opposite edges 16 and 18 of the tile 10 are formed to interlock with mating edges of adjacent tiles.

FIG. 2 depicts a flat roof tile 20 constructed with the composition of the present invention. The tile 20 has a rectangular shape and presents edges 22 and 24 formed to interlock with the mating edges of adjacent tiles. Again, the tile 20 has a conventional construction except for the composition used to fabricate it.

The tile shapes shown in the drawing are illustrative only, and it is to be understood that the composition of the present invention can be used to construct roof tiles having shapes other than those illustrated.

In accordance with the invention, a composition for constructing roof tiles such as the tile 10 or the tile 20 has a dry component and a wet component which are combined in a process used to fabricate the tiles. The dry component includes cement, gypsum, perlite aggregate, lava stone, and a powder which may be either perlite powder or volcanic ash. These dry constituents may be packaged together, such as in bags, or they may be furnished separately or in partial mixtures which are combined at the time the entire composition is being formulated to construct tiles.

Preferably, the cement is portland cement which is readily available. The gypsum is preferably a high density gypsum composition which is commercially available from U.S. Gypsum Company under the trademark HYDROSTONE. The perlite aggregate may be expanded perlite aggregate, and it is preferably #6 classified perlite aggregate having its particles classified as #6 size. The lava stone is a lightweight yet strong rock material. It may be lava stone which is commercially available as "Red Quarter Lunar Stone". The particles of lava stone in this product are no larger than about ¼ inch in their largest dimension, and that size is preferred for the composition of this invention.

The powder serves primarily to fill in gaps between particles of the aggregate and lava stone. Either perlite powder or volcanic ash can be used. It is preferred that the powder contain granules 50 mesh in size or less.

The liquid portion of the composition includes water and a catalyst which promotes chemical reactions among itself and the other constituents when mixed together. The catalyst is a styrene acrylic catalyst. One that is used to good effect is a catalyst that is commercially available from Geobond International, Inc. as "Geobond Catalyst H6".

The constituents in the composition are preferably present in approximately the following proportions by weight: 154–214 parts cement; 147–203 parts gypsum; 35–50 parts perlite aggregate; 59–82 parts lava stone; 10–14 parts perlite powder or volcanic ash; 49–68 parts catalyst; and 92–138 parts water. These proportions result in a roof tile having a high impact strength and breaking load, along with a light weight, fire resistance, resistance to the absorption of water, and resistance to harmful effects from freezing-thawing cycles.

In accordance with the invention, roof tiles are constructed using a process that involves mixing the constituents together to formulate the composition, forming the tiles in the desired manner such as by extrusion, and air drying them at room temperature.

Initially, the constituents of the dry portion of the composition are mixed together. Whether they are packaged together or separately, the cement, gypsum, perlite aggregate, lava stone and powder (perlite or volcanic ash) are pre-blended, as by mixing them in a horizontal paddle mixer for about 15 minutes. Then, part of the total amount of water that is to be used is added to another mixer which may be a production paddle mixer. Preferably, the amount of water added to the production paddle mixer at this point is one half of the total water to be used. The pre-blended dry mixture is added to the water in the production paddle mixer, and the contents of this mixer are allowed to mix for about 1–2 minutes as the mixture is hydrated.

After the 1–2 minute hydration period has elapsed, the catalyst and the remaining water (the other one half of the total) are added to the hydrated mixture in the production paddle mixer. The mixer is operated to blend all of the constituents of the composition for about 5–7 minutes.

Next, the composition is conveyed to an extruder (or other equipment used to form the tile shapes). The extruder compresses and forms the tiles into the desired shape. Finally, the tiles are allowed to air dry at room temperature. There is no curing or drying equipment required, nor is it necessary for any special temperature or humidity levels to be maintained.

Pigments or mineral colors can be added to the mixture to color the tiles as desired.

Test samples have been produced and tested to confirm the properties of tiles constructed using the composition of this invention. Each batch of samples included three tiles, and all tiles were tested for breaking load using prevailing procedures. All tiles were tested approximately 28 days after production.

| BATCH 1 | | |
|---|---|---|
| | WEIGHT (LBS.) | BREAKING LOAD (LBS.) |
| Tile 1 | 6.07 | 436.5 |
| Tile 2 | 5.87 | 435.5 |
| Tile 3 | 5.94 | 412.0 |
| Average | 5.96 | 428 |

| BATCH 2 | | |
|---|---|---|
| | WEIGHT (LBS.) | BREAKING LOAD (LBS.) |
| Tile 1 | 6.53 | 409.5 |
| Tile 2 | 6.38 | 341.5 |
| Tile 3 | 6.42 | 570.0 |
| Average | 6.44 | 440.33 |

The differences between these two batches are attributable to differences in the proportions of the constituents of the composition. The tiles in batches 1 and 2 are barrel type tiles having approximate dimensions of 16.4 inches long ×13.2 inches wide×3 inches high. With these dimensions, a "square" (100 square feet of roof surface) requires 90 tiles. Using the average weight figures, a square of tiles in batch 1 would weigh 536.4 lbs, while a square of tiles in batch 2 would weigh 579.9 lbs. It is noted that building codes generally call for a maximum of 700 lbs per square which is easily satisfied by both batches. The most restrictive building code in the country (which is applicable only in a relatively small area in California) requires no more than 600 lbs per square, and both batches meet even this restrictive code provision.

| BATCH 3 | | |
|---|---|---|
| | WEIGHT (LBS.) | BREAKING LOAD (LBS.) |
| Tile 1 | 6.90 | 692.5 |
| Tile 2 | 6.98 | 678.5 |
| Tile 3 | 6.96 | 816.5 |
| Average | 6.94 | 729.16 |

While the tiles of batch 3 are somewhat heavier than those of batches 1 and 2, they are considerably stronger and in fact exhibit an exceptionally high resistance to breaking. A square of these tiles weights slightly over 600 lbs but is well under the prevailing building code requirement of 700 lbs. A slight reduction in weight would bring the tiles into conformity with even the strictest building code (600 lbs per square), while the strength would likely be affected only minimally. The breakage of these tiles was observed to involve internal shearing through the aggregates (perlite and lava stone). No pull through of aggregate particles was noted, meaning that the internal materials are secured in the strata of the tiles.

In general, the tiles of the present invention are approximately ½ as heavy as conventional concrete roof tiles. Even so, their strength is essentially the same as that of concrete tiles. Because of the reduced weight, conventional roof framing of the type used for asphalt or wood roofs is normally all that is required.

The strength is attributable in large part to chemical reaction of the catalyst with the gypsum. The perlite aggregate and especially the lava stone are distributed throughout the tiles and provide reinforcement that prevents crumbling of the cement. The powder and the catalyst plug the pores of the lava stone and fill in gaps between the particles of the tile. As a result, the water absorption and permeability is less than with concrete roof tiles. Because water and moisture penetration is resisted, the tiles are not susceptible to problems caused by freeze-thaw cycles.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A lightweight roof tile constructed of a composition comprising cement present in the amount of approximately 154–214 parts by weight, gypsum present in the amount of approximately 147–203 parts by weight, perlite aggregate present in the amount of approximately 35–50 parts by weight, lava stone present in the amount of approximately 59–82 parts by weight, water present in the amount of approximately 92–138 parts by weight, a catalyst comprising styrene acrylic present in the amount approximately 49–68 parts by weight, and a powder selected from the group consisting of perlite powder and volcanic ash present in the amount of approximately 10–14 parts by weight.

2. The composition of claim 1, wherein the perlite aggregate comprises expanded perlite aggregate.

3. The composition of claim 1, wherein said lava stone comprises lava stone pieces all having a maximum dimension less than approximately one fourth inch.

4. A composition for constructing a lightweight roof tile exhibiting fire resistance, said composition comprising:

(a) a dry portion which includes cement present in the composition in the amount of approximately 154–214 parts by weight, gypsum present in the composition in the amount of approximately 147–203 parts by weight, perlite aggregate present in the composition in the amount of approximately 35–50 parts by weight, lava stone present in the composition in the amount of approximately 59–82 parts by weight and a powder selected from the group consisting of perlite powder and volcanic ash present in the composition in the amount of approximately 10–14 parts by weight; and (b) a liquid portion for mixing with said dry portion to provide said composition, said liquid portion including water present in the composition in the amount of approximately 92–138 parts by weight and a catalyst comprising styrene acrylic present in the composition in the amount of approximately 49–68 parts by weight.

5. The composition of claim 4, wherein the perlite aggregate comprises expanded perlite aggregate.

6. The composition of claim 4, wherein said lava stone comprises lava stone pieces all having a maximum dimension less than approximately one fourth inch.

7. A method of constructing lightweight roof tiles exhibiting fire resistance, said method comprising the steps of:

providing a dry mixture comprising cement present in the amount of approximately 154–214 parts by weight, gypsum present in the amount of approximately 14–203 parts by weight, perlite aggregate present in the amount of approximately 35–50 parts by weight, lava stone present in the amount of approximately 59–82 parts by weight and a powder selected from the group consisting of perlite powder and volcanic ash present in the amount of approximately 10–14 parts by weight;

blending with said dry mixture water present in the amount of approximately 92–138 parts by weight and a catalyst comprising styrene acrylic present in the amount of approximately 49–68 parts by weight, thereby providing a tile composition;

forming said composition into the shape of a roof tile; and allowing the tile shape to air dry at room temperature.

8. A method as set forth in claim 7, wherein said blending step comprises:

adding together a selected amount of the water and said dry mixture to hydrate the mixture; and thereafter adding the catalyst and the remainder of the water to the hydrated mixture and blending the hydrated mixture together with the catalyst and said remainder of the water.

9. A method as set forth in claim 8, wherein the catalyst, said remainder of the water and the hydrated mixture are blended together for approximately 5–7 minutes.

10. A method as set forth in claim 9, wherein there is an interval of approximately 1–2 minutes between adding together said selected amount of water and said dry mixture and adding the catalyst and said remainder of the water to the hydrated mixture.

11. A method as set forth in claim 10, wherein said selected amount of the water is substantially equal in amount to said remainder of the water.

12. A method as set forth in claim 8, wherein said selected amount of the water is substantially equal in amount to said remainder of the water.

* * * * *